Oct. 8, 1946.  W. P. LEAR  2,409,131

SIREN FOR AIRCRAFT

Original Filed Feb. 21, 1942

INVENTOR
William P. Lear
BY Richard A. Marsen
his ATTORNEY

Patented Oct. 8, 1946

2,409,131

UNITED STATES PATENT OFFICE 2,409,131

SIREN FOR AIRCRAFT

William P. Lear, North Hollywood, Calif., assignor, by mesne assignments, to Lear, Incorporated, Grand Rapids, Mich., a corporation of Illinois Original application February 21, 1942, Serial No. 431,814. Divided and this application August 24, 1943, Serial No. 499,755

4 Claims. (Cl. 244—1)

This invention relates to high intensity sound producing systems for aircraft, and more particularly to siren systems adapted to be incorporated in the structure of an aircraft in such a way as to offer substantially no aerodynamic resistance. The present application is a division of my co-pending application Serial No. 431,814 filed February 21, 1942, now Patent No. 2,392,394 issued January 8, 1946.

In accordance with the present invention, sirens or similar sound producing devices are incorporated within the surface structure or fuselage of an aircraft for operation by aerodynamic power generated during flight. The siren systems are so arranged as to normally not interfere with the aerodynamic characteristics of the aircraft, nor add any drag. When it is desired to operate the sirens to produce intense sounds, as for example during dive bombing maneuvers, the tremendous aerodynamic forces associated with the aircraft in high speed flight are utilized for the operation. An important feature of the present invention thus resides in the utilization of a substantial portion of the aerodynamic power generated by an aircraft in flight to operate powerful sound producing means. When it is considered that a modern combat plane exerts thousands of horsepower in full flight condition, a considerable array of siren means according to my invention can be driven without requiring auxiliary or standby power plants. The invention is particularly directed to a novel arrangement for incorporating an array of powerful sirens within the structure of the aircraft, and for selectively operating them into the inactive and into the sound producing conditions.

The above and further advantages, capabilities and features of the present invention will appear in the following description of a specific embodiment thereof and from the accompanying drawing. In the drawing.

Figure 1:
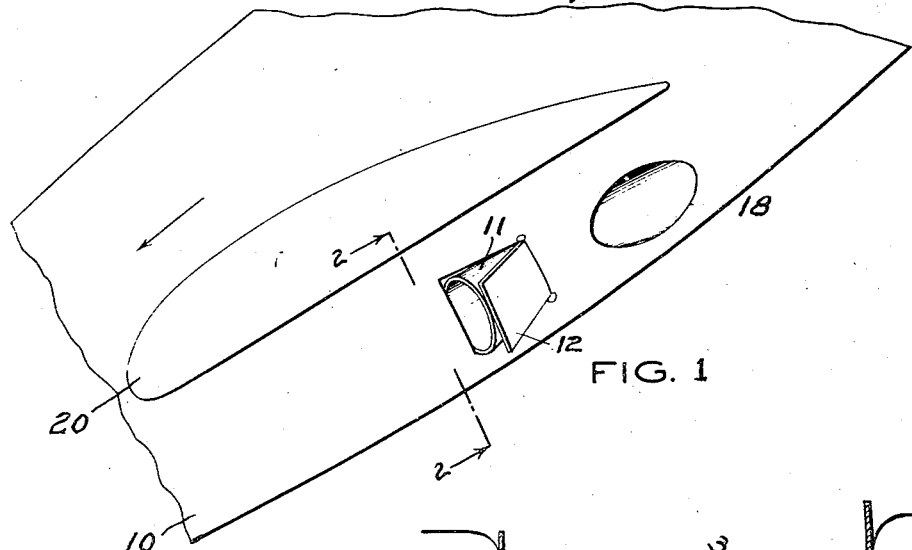
Fig. 1 is an elevation view of an embodiment of the invention incorporated in the fuselage of an aircraft.
Figure 2:
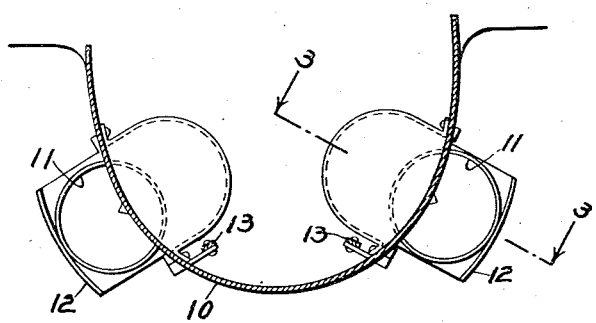
Fig. 2 is a cross-sectional view through the system of Fig. 1 as taken along the line 2—2 of Fig. 1.

In the embodiment of the invention shown in the drawing, the sirens are mounted within the fuselage 10 of an aircraft 15 having a wing structure 20. Two siren assemblies, one on each side of the lower portion of fuselage 10 as shown. The siren systems 25 are so arranged as to be substantially enclosed within the fuselage 10 so as to offer no aerodynamic resistance to flight of the aircraft. Each siren system comprises a pivoted funnel intake section 11 to which is secured a fuselage section or window 12 for movement as a unit therewith. Both the intake section and the fuselage section may be extended by a lever 13 through the medium of a bell crank arrangement 14. Lever 13 may extend to a position adjacent the pilot's compartment for selective operation by the pilot or be remotely controlled.

The intake section 12 converges to a central conduit section 16 which encloses a siren 25 at its region of smallest cross-section. The conduit section 16 flares outwardly from its narrowest section to an outlet section 17 which communicates with the exterior of the fuselage at an opening 18. The conduit arrangement of intake section 11, conduit section 16 and outlet section 17 is generally in the shape of a Venturi tube, so that maximum airflow intensity exists at the siren 25 located at the narrow portion of section 16. The walls of intake section 11 are aligned and substantially coextensive with the walls of central section 16 when section 11 is in the illustrated extended position. Intake section 11 scoops up and otherwise receives air at the high velocity of the aircraft in flight, and imparts the air in a substantially continuous and uninterrupted stream to the siren 25. The air thus drives the siren 25 and is discharged through the outlet section 17 to the outside and towards the rear of the aircraft. The general air flow through the conduit is indicated by the series of arrows in Fig. 3.

The sirens 25 may be of any suitable size or design for emitting the powerful sounds required at the desired pitch. While two siren assemblies have been illustrated, it is to be understood that any other number may be employed. Preferably, all the siren systems are interconnected to a common operating control, such as the lever 13. The front face of siren 25 is in the form of an annular face plate 21 attached to the corresponding circular minimum section of conduit 16. Face plate 21 has suitable spaced openings 22. A rotor 23 is arranged adjacent to plate 21, and is supported between bearing 24 in plate 21 and bearing 26 in a bracket 27 suitably secured to the walls of section 16.

The rectangular windows 12 are essentially sections of fuselage 10 which correspond to the respective components required by the intake sections 11 in their extended position. Each window 12 is secured to its conduit section 11 along the central longitudinal region. Thus, when a section 11 is retracted as shown by the dotted line indication 11a in Fig. 3, window 12 is flush with fuselage 10 as shown by dotted line 12a. Intake section 11 in its retracted position fits into a correspondingly shaped receptacle 28 joined with the forward edge of the central conduit section 16. Receptacle 28 is constructed so as to prevent air leakage from the conduit siren arrangement into the interior of the fuselage. The bell crank 15 for mounting the intake section 11 and window 12 is pivoted on a suitable pivotal mounting 29 in fuselage 10.

Figure 3:
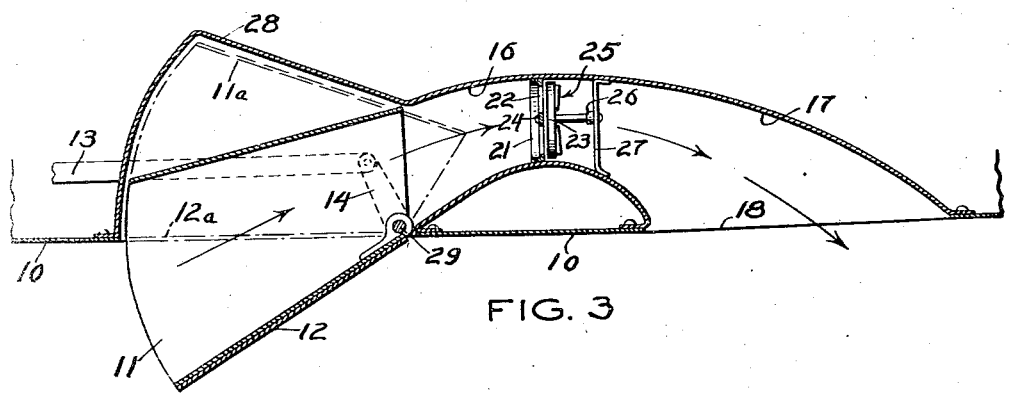
Fig. 3 is a longitudinal sectional view through the siren system of Figs. 1 and 2 as taken along the line 3—3 of Fig. 2.

Normally, the intake section 11 is in the retracted position shown in dotted lines in Fig. 3. When it is desired to operate the sirens, lever 13 is actuated and through bell crank 14 intake section 11 is extended to scoop up air and cause operation of the sirens. It will be noted that, in the retracted position, the intake section 11 and window 12 form a substantially unitary part of the fuselage 10 and offer no aerodynamic resistance to flight of the aircraft.

While a specific embodiment of the invention has been shown and described to illustrate the application of the principles thereof, it will be understood that the invention may otherwise be embodied without departing from such principles.

What I claim is:

1. The combination with an aircraft of sirens fixedly mounted within the fuselage of the aircraft; an air duct surrounding each of said sirens and extending on either end to air intake and air outlet openings in the fuselage, each of said ducts converging from each end toward its center; said sirens being supported at substantially the narrowest cross-sectional region in said ducts; air scooping means attached to said fuselage at said intake openings; said air scoop means each having a fuselage section secured thereto and conforming with the surface contour of the fuselage when said scoop means is retracted; and said ducts being formed with receptacle portions receiving said scoop means in the retracted position.

2. The combination with an aircraft of sirens fixedly mounted within the fuselage of the aircraft; an air duct surrounding each of said sirens and extending on either end to air intake and air outlet openings in the fuselage, each of said ducts converging from each end toward its center; said sirens being supported at substantially the narrowest cross-sectional region in said ducts; air scooping means attached to said fuselage at said intake openings; said air scoop means each having a fuselage section secured thereto and conforming with the surface contour of the fuselage when said scoop means is retracted; said ducts being formed with receptacle portions receiving said scoop means in the retracted position; and common operating means for extending and retracting said scoop means in unison.

3. The combination with an aircraft of sirens fixedly mounted within the fuselage of the aircraft; an air duct surrounding each of said sirens and extending on either end to air intake and air outlet openings in the fuselage, each of said ducts converging from each end toward its center; said sirens being supported at substantially the narrowest cross-sectional region in said ducts; air scooping means attached to said fuselage at said intake openings; said air scoop means each having a fuselage section secured thereto and conforming with the surface contour of the fuselage when said scoop means is retracted; said ducts being formed with receptacle portions receiving said scoop means in the retracted position; and common operating means comprising an arm connected to each scoop means and levers connected to said arms for extending and retracting said scoop means in unison.

4. The combination with an aircraft of an air siren fixedly mounted within the structure of the aircraft; an air duct, in the form of a Venturi tube, surrounding said air siren and extending on either end to flaring forwardly and rearwardly directed openings in the structure; said siren being located at the smallest cross-section of said air duct; a tubular air scoop hinged to said structure at said flaring forwardly directed opening and constituting a movable section of said duct; and mechanism for controlling the extension of said scoop to conduct an air flow through said duct to operate said siren.

WILLIAM P. LEAR.